(12) United States Patent
Duranton

(10) Patent No.: US 6,502,151 B2
(45) Date of Patent: *Dec. 31, 2002

(54) DATA-PROCESSING ARRANGEMENT INCLUDING AN INTERRUPT GENERATOR

(75) Inventor: Marc Duranton, Boissy Saint Leger (FR)

(73) Assignee: Koninklijke Philips Electronics N.V., Eindhoven (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,809

(22) Filed: May 27, 1999

(65) Prior Publication Data

US 2002/0169909 A1 Nov. 14, 2002

(51) Int. Cl.[7] .................................................. G06F 13/24
(52) U.S. Cl. ............................ 710/260; 714/39; 714/47
(58) Field of Search ................................ 710/260–269; 714/47, 39

(56) References Cited

U.S. PATENT DOCUMENTS 5,504,684 A * 4/1996 Lau et al. ..................... 455/3.2
5,564,015 A * 10/1996 Bunnell ......................... 714/47
6,112,318 A * 8/2000 Jouppi et al. .................. 714/47

FOREIGN PATENT DOCUMENTS

EP 0395281 A2 10/1990

OTHER PUBLICATIONS

"Event Triggered Performance Monitoring" IBM Technical Disclosure Bulletin, US, IBM Corp. New York, vol. 37, No. 9 Sep. 1, 1994, pp. 465–467.
"Cascaded Error Injection Event Counters" IBM Technical Disclosure Bulletin, US IBM Corp. New York, vol. 37, No. 3, Mar. 1, 1994, pp. 385–386.

* cited by examiner

Primary Examiner—Rupal Dharia

(57) ABSTRACT

A data-processing arrangement (DPA) comprises an interrupt generator (IG). The interrupt generator (IG) carries out a count (CNT) of events (E) of a certain type (T1) occurring in the data-processing arrangement (DPA). The interrupt generator (IG) provides an interrupt signal (IS) when a predefined number (N) of events (E[T1]) have been counted. The interrupt generator (IG) comprises a programmable start-event selector (SEL[STRT]) for selecting a type (T2) of event (E) which starts (STRT) the count (CNT).

Accordingly, there is no need for any controller to start the count and, consequently, there is neither need for a further interrupt generator nor for a special subroutine to make the controller start the count. Consequently, the data processing arrangement as summarized hereinbefore yields better efficiency either cost-wise or software-wise, or both.

3 Claims, 3 Drawing Sheets

DATA-PROCESSING ARRANGEMENT INCLUDING AN INTERRUPT GENERATOR

FIELD OF THE INVENTION

The invention relates to a data-processing arrangement comprising an interrupt generator for carrying out a count of events of a certain type which may occur in the data-processing arrangement, and for providing an interrupt signal when a predefined number of events have been counted. The data-processing arrangement may be, for example, a multimedia processor suitable for processing various types of data.

BACKGROUND ART

European patent application publication number 0,395,281 describes a computer system which employs an apparatus for controllably generating interrupts to a computer system processor. The apparatus includes at least one pair of counters. The counters are configured by a value stored in a control register. Each half of the control register includes a single bit reset signal and a 12-bit select signal. Control of the particular significant event being counted by the counters is effected via a combination of multiplexers and their associated 12-bit select signals stored in the control register. The single bit reset portions of the control register are connected to the reset input ports of the counters. This feature is useful in that it provides the computer system processor with the ability to "know" precisely when the counting procedure begins. An interrupt is generated when a count exceeds a preselected value.

SUMMARY OF THE INVENTION

It is an object of the invention to provide a data-processing arrangement as defined in the opening paragraph, which yields a better efficiency either cost-wise or software-wise, or both.

The invention takes the following aspects into consideration. An interrupt signal usually indicates a main event in the data-processing arrangement. The main event itself may be based on two different types of events in the data-processing arrangement. For example, let it be assumed that the following is a main event. A data processor has not completed a certain data-processing task within 300 clock cycles. This main event is based on the following two types of events X and Y. An event of the type X is that the data processor starts to carry out the task concerned. An event of the type Y is the completion of a clock cycle. Thus, the interrupt generator should start to carry out a count of events of the type Y when an event of the type X has occurred, and it should provide an interrupt signal when the count is 300.

In some data-processing arrangements, there may be a wide variety of main events which need to be indicated by means of interrupt signals. A main event may differ from an other main event not only in that the type of the events to be counted is different, but also in that the type of the event which should start the count is different. In principle, it is possible to have a dedicated interrupt generator for each different main event. However, this is not a very efficient solution in terms of hardware.

The interrupt generator described in the background art can, in principle, provide different types of interrupt signals relating to different main events. However, it has the following inconvenience. The start of a count of events of certain type, for example events of the type A, is given by means of a reset signal which originates from a controller. This implies that the controller needs to have knowledge of an event which should start the count, for example an event of the type B. If events of the type B are neither pre-defined or nor defined by the controller itself, an interrupt signal or the like is needed to inform the controller that an event of the type B has occurred. Thus, an additional interrupt generator may be required. In any case, the controller will have to interrupt any control tasks it is carrying out when an event of the type B has occurred. The controller has to instruct the interrupt generator immediately to start counting events of the type A. This requires a special subroutine in the controller software.

According to the invention, the interrupt generator comprises a programmable selector for selecting a type of event which starts the count. Accordingly, a controller, if any, can program the programmable selector in advance to select a particular type of event which starts the count. Accordingly, when the event of the selected type occurs, the interrupt generator will start the count autonomously without this requiring any intervention from a controller. Thus, there is no need to inform the controller that a count-starting event has occurred, which would otherwise require an additional interrupt generator. Furthermore, there is no need for a special subroutine in the controller software for instructing the interrupt generator to start the count. Consequently, the invention yields a better efficiency either cost-wise or software-wise, or both.

The invention and additional features, which may be optionally used to implement the invention to advantage, are apparent from and will be elucidated with reference to the drawings described hereinafter.

DETAILED DESCRIPTION OF THE DRAWINGS

The following remarks relate to reference signs. Like entities are designated by like letter references in all the Figures. Several similar entities may appear in a single Figure. In that case, a digit or a suffix is added to the letter reference in order to distinguish like entities. The digit or the suffix may be omitted for convenience or it may be replaced by an asterisk in the case where its value is not important (do not care value). This applies to the description as well as the claims.

Figure 1:
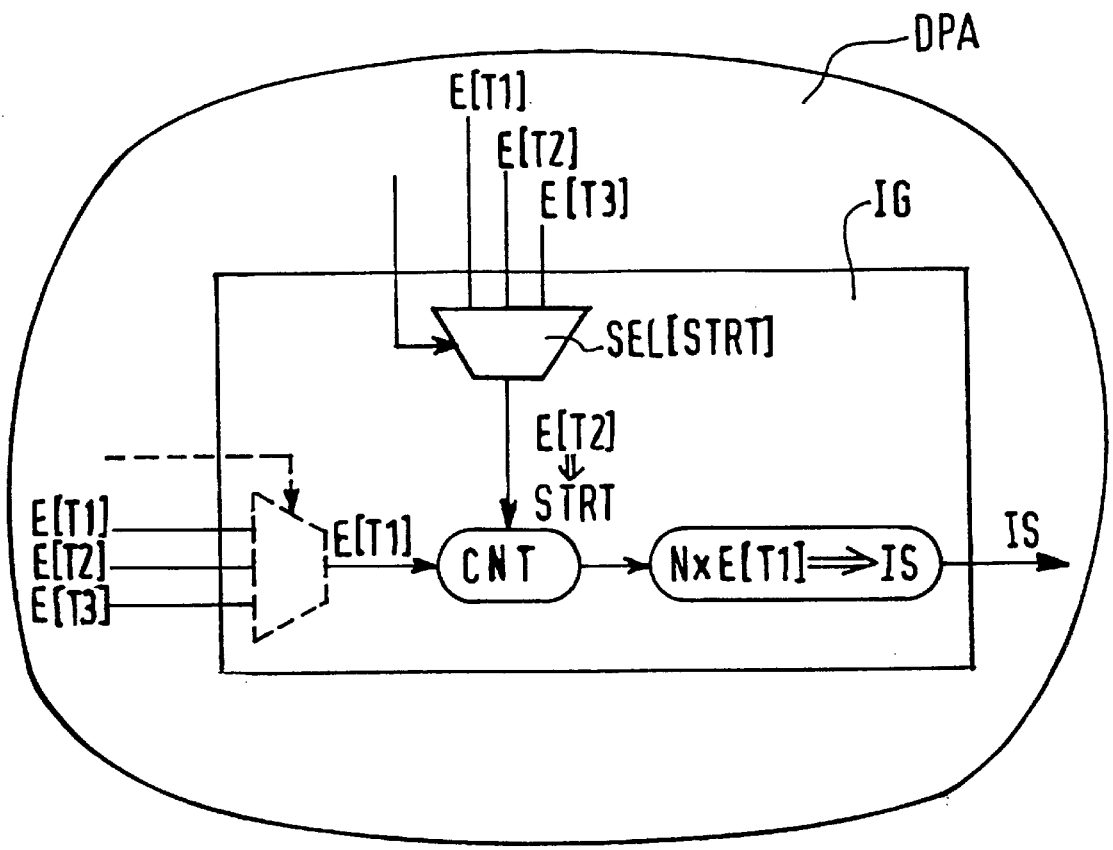
FIG. 1 is a conceptual diagram illustrating basic features of the invention as claimed in claim 1.

FIG. 1 illustrates basic features of the invention in solid lines. A data-processing arrangement DPA comprises an interrupt generator IG. The interrupt generator IG carries out a count CNT of events E of a certain type T1 occurring in the data-processing arrangement DPA. The interrupt generator IG provides an interrupt signal IS when a predefined number N of events E[T1] have been counted. The interrupt generator IG comprises a programmable selector SEL [STRT] for selecting a type T2 of event E which starts STRT the count CNT.

FIG. 1 further illustrates the following feature in broken lines. The interrupt generator IG comprises a further programmable selector for selecting the type T of events which are counted. If this feature is applied, the interrupt generator IG can make relatively many different combinations of a type of event which is counted and a type of event which starts a count. Since each combination relates to a different main event in the data-processing arrangement DPA, the interrupt generator IG can therefore indicate a great variety of main events by means of interrupt signals IS.

Figure 2:
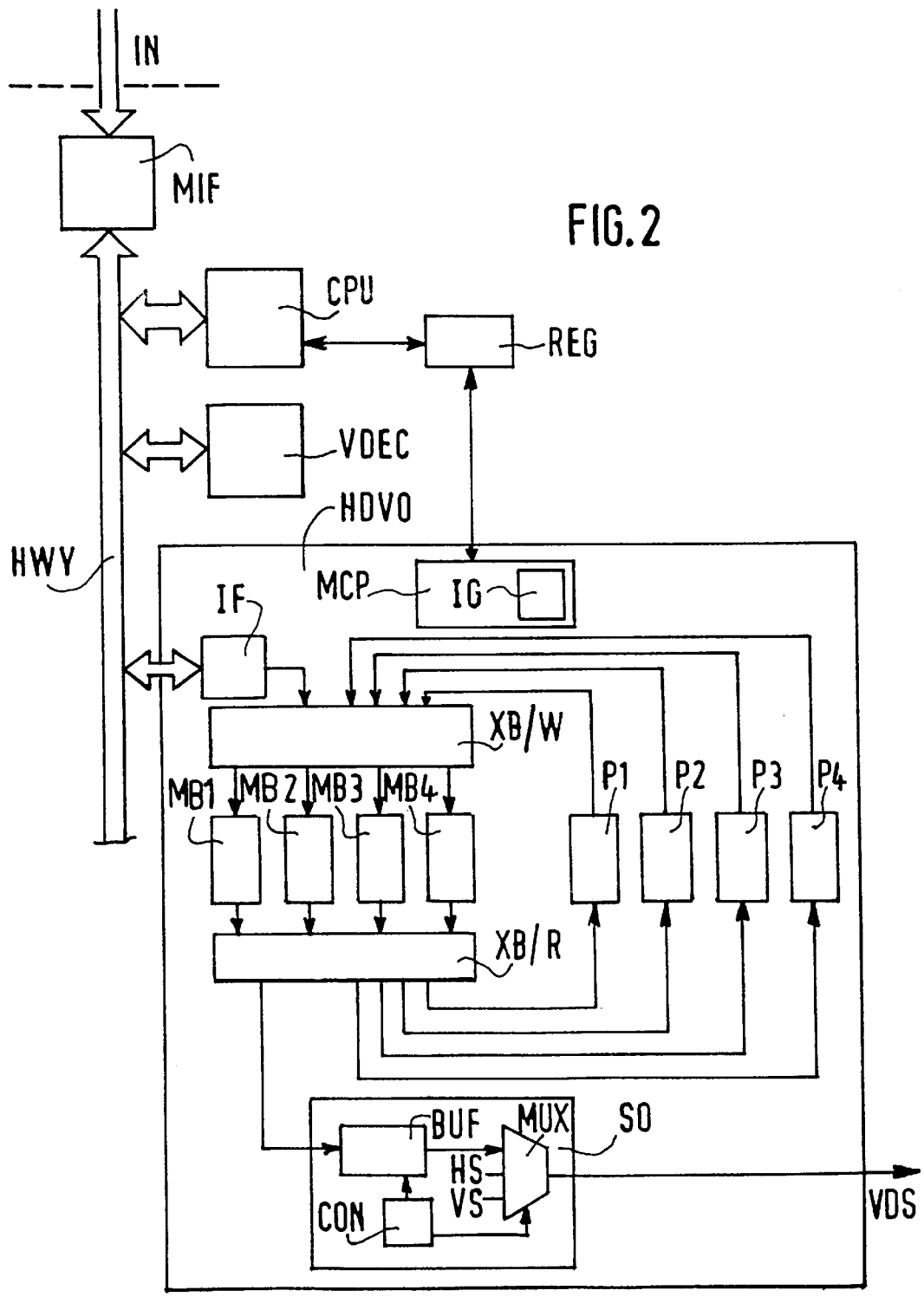
FIG. 2 is a block diagram illustrating an example of a data processing arrangement in accordance with the invention.

FIG. 2 illustrates a multimedia processor in accordance with the invention. The multimedia processor processes input data IN comprising coded video data so as to provide, amongst other things, a video data stream VDS adapted for display on a display device. The multimedia processor comprises an main interface MIF, a main bus HWY, a central processing unit CPU, a main instruction register REG and various main processors. Two main processors are shown: a video decoder VDEC and a video output unit HDVO. The video output unit HDVO comprises a master control processor MCP and the following data-handling elements: an interface IF, a read crossbar XB/W, a write crossbar XB/R, memory blocks MB, processors P, and a streaming out circuit SO. The master control processor MCP includes an interrupt generator IG. The streaming out circuit SO includes a buffer BUF, a multiplexer MUX and a controller CON.

The multimedia processor basically operates as follows. The central processing unit CPU controls the various elements of the multimedia processor by means of instructions. The main interface MIF fetches the input data IN from an external main memory for example. This memory is not shown in FIG. 2. The video decoder VDEC decodes the coded video data contained in the input data IN. Accordingly, decoded video data is obtained which may be temporarily stored in the external main memory. The video output unit HDVO adapts the decoded video data for display on a particular display device. In addition, the video output unit HDVO may combine the decoded video data with other video data so as to provide features such as picture-in-picture or blending.

The operation of the video output unit HDVO will now be explained in greater detail. The video output unit HDVO alternately carries out configuration steps and processing steps. In a configuration step, the master control processor MCP makes that the data-handling elements load configuration data. The configuration data loaded in a data-handling element determines the operation of this element during the processing step which succeeds the configuration step. For example, the configuration data loaded in the crossbar XB/W and XB/R determines connections between, on the one hand, the memory blocks MB and, on the other hand, the interface IF, the streaming out circuit SO and processors P. When a data-handling element has loaded its configuration data, it supplies a configuration-done signal to the master control processor MCP. The master control processor MCP provides a start-processing signal to the processor P after each data-handling element has provided its configuration-done signal. The start-processing signal marks the beginning of the processing step.

In a processing step, each processor processes a specific number of pixels stored in a memory block MB to which the processor P is connected. The number of pixels which a processor P processes is defined by the configuration data and, for example, the number does not exceed 256. Once the processor P has processed the specific number of pixels it will stop processing and supply an end-of-operation signal to the master control processor MCP. The processing step ends when all processors P have supplied an end-of-operation to the master control processor MCP. In response, the master control processor P will carry out a new configuration step.

Accordingly, the video output unit HDVO processes the decoded video data in a block-wise manner. For example, in a first processing step the interface IF writes a block of 256 pixels into memory block MB1 via the write crossbar XB/W. In a second processing step, processor P1 reads the block of 256 pixels from memory block MB1 and processes it. Processor P1 may be, for example, a horizontal video filter which makes a weighed combination of several pixels belonging to the same line. Accordingly, processor P1 provides a block of horizontally filtered pixels and writes this block into memory block MB2. In a third processing step, processor P2 reads the block of processed horizontally filtered pixels from the memory block MB2 and processes it. Processor P2 may be, for example, a vertical video filter which makes a weighed combination of corresponding pixels belonging to neighboring lines. If the block of horizontally filtered pixels belongs to one line, the processor P2 will read other blocks of horizontally filtered pixels belonging to neighboring lines. Accordingly, processor P2 provides a block of horizontally-and-vertically filtered pixels and writes this block into memory block MB3. There may be further processing steps in which processor P3 or P4, or both, further process the block of horizontally-and-vertically filtered pixels contained in memory block MB3. By way of example, it is assumed that the block of horizontally-and-vertically filtered pixels is ready to form part of the video data stream VDS. Accordingly, in a fourth processing step, the block concerned will be transferred from memory block MB3 to the buffer BUF of the streaming out circuit SO.

The streaming out circuit SO generally receives a block of processed pixels with each processing step and stores it in its buffer BUF. The streaming out circuit SO reads the processed pixels from its buffer BUF for providing the video data stream VDS. The controller CON has knowledge of the desired format of the video data stream VDS, for example in terms of line frequency, field frequency, number of pixels per line, and number of lines per field. The controller CON makes that processed pixels are read from the buffer BUF at the right instants and, thus, at the desired rate. The controller CON further controls the multiplexer MUX which receives the pixels and several control signals such as horizontal and vertical synchronization signals HS, VS, for example. Accordingly, appropriate control signals are inserted between the pixels at the right instants.

The streaming out circuit SO supplies various types of indications to the master control processor MCP relating to different types of events in the streaming out circuit SO. One of type of indication is a warning. The controller CON can be programmed such that a warning is provided when a specific type of event occurs. For example, the controller CON can be programmed to provide a warning when the amount of pixels contained in the buffer BUF is below a desired minimum level or above a desired maximum level. Such an underflow or overflow warning can be provided in the following manner. The controller CON manages the writing into and the reading from the buffer BUF by means of a write pointer and a read pointer. The write pointer is the address of the buffer BUF under which the next pixel to be received from a memory block MB is to be stored. The read pointer is the address from which the next pixel for the video data stream VDS is to be read. The difference between the write pointer and the read pointer indicates the amount of data contained in the buffer BUF. It can therefore be used to provide an underflow or overflow warning.

The master control processor MCP programs the interrupt generator IG to provide an interrupt signal when a particular main event occurs in the video output unit HDVO. The master control processor MCP carries out a particular control task in response to an interrupt signal. Accordingly, the master control processor MCP copes with the main event detected by the interrupt generator IG. To that end, the master control processor MCP may comprise a program memory with several subroutines for coping with different main events. Since the master control processor MCP has programmed the interrupt generator IG, it therefore knows which main event has occurred when the interrupt generator IG provides an interrupt signal and, consequently, it knows which subroutine to pick.

Figure 3:
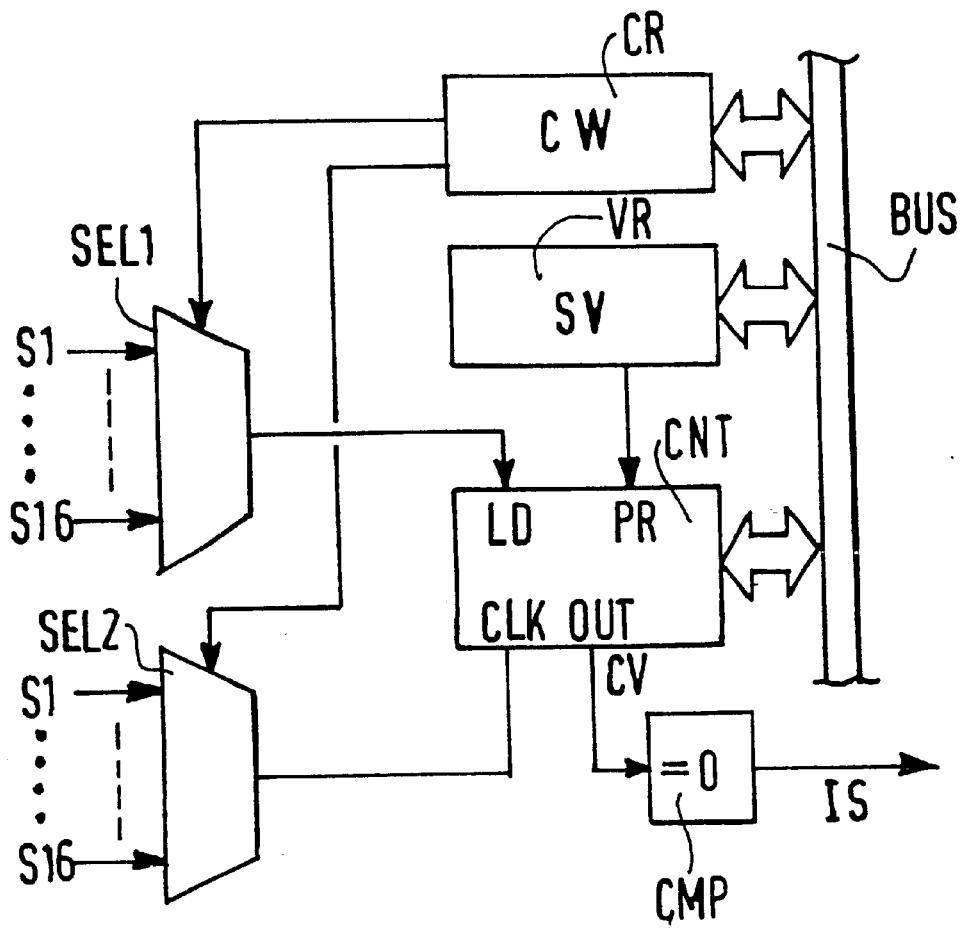
FIG. 3 is a block diagram illustrating an example of an interrupt generator in the data processing arrangement illustrated in FIG. 2.

FIG. 3 illustrates further details of the interrupt generator IG comprised in the master control processor MCP shown in FIG. 2, The interrupt generator IG comprises a control register CR, a start-value register VR, a counter CNT, a comparator CMP and two selectors SEL1, SEL2. The selectors SEL both receive 16 signals S1–S16 originating from various elements in the multimedia processor shown in FIG. 2. These signals will be described in greater detail hereinafter. The control register CR, the start-value register VR and the counter CNT are coupled to an internal bus BUS of the master control processor MCP. The counter CNT has a load input LD to which selector SEL1 is coupled, a preset input PR to which the start-value register VR is coupled, a clock input CLK to which selector SEL2 is coupled, and an output OUT to which the comparator CMP is coupled.

The interrupt generator IG illustrated in FIG. 3 basically operates as follows. The master control processor MCP writes a control word CW into the control register CR via the internal bus BUS. It further writes a start value SV into the start-value register VR via the internal bus BUS. The control word CW contained in the control register CR controls the selectors SEL. The selectors SEL1 selects a signal S for supply to the load input LD of the counter CNT on the basis of the control word CW. The selector SEL2 selects an other signal S which is supplied to the clock input CLK of the counter CNT.

The counter CNT loads the start value SV contained in the start-value register VR in response to a transition from a binary zero (0) to a binary one (1) at the load input LD. Such a transition will hereinafter be referred to as a positive edge. When the counter CNT has loaded the start value VAL, it will decrement the start value SV unit-by-unit with each positive edge occurring at the clock input CLK. Accordingly, the counter CNT will contain a count value CV which is the start value SV minus the number of positive edges having occurred at the clock input CLK since the positive edge occurred at the load input LD. The comparator CMP receives the count value CV and provides an interrupt signal IS when the count value CV equals zero.

Positive edges may occur simultaneously at the load input LD and the clock input CLK. In such a case, the positive edge at the load input LD will always be taken into account. That is, the start value SV in the start-value register VR will be loaded into the counter CNT. If the count value CV is one (1), which means that the count value CV is just about to go to zero (0), an interrupt signal IS will be generated too. However, if the count value is not one (1), the positive edge at the clock input CLK will effectively be ignored.

Figure 4:
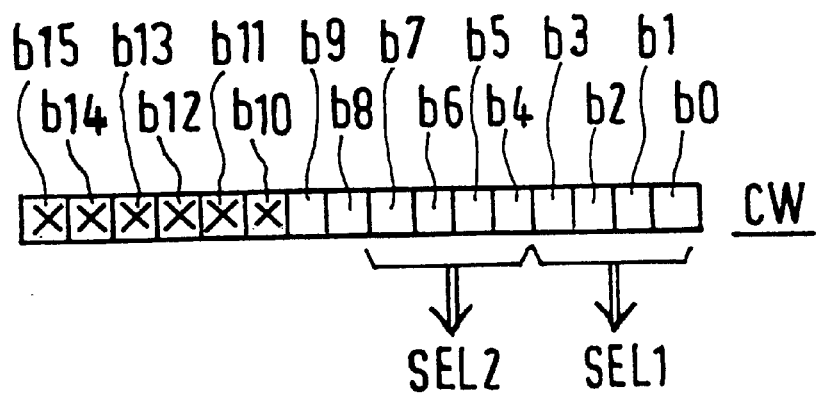
FIG. 4 is a binary-word diagram illustrating a control word for the interrupt generator illustrated in FIG. 3.

FIG. 4 illustrates an example of the control word CW. The control word CW comprises 16 bits b0–b15. Bits b0–b9 have a control function. That is, the interrupt generator IG illustrated in FIG. 3 will operate in a manner which depends on the values of these bits. This is explained in greater detail hereinafter. Bits b10–b15 have no control function.

Bits b0–b3 control the selector SEL1 and, therefore, determine which signal S is applied to the load input LD of the counter CNT. The bits b0–b3 represent a value with b3 being the most significant bit and b0 being the least significant bit. The signal which is applied to the load input LD is the signal S whose number corresponds to this value.

Bits b4–b7 control the selector SEL2 and, therefore, determine which signal S is applied to the clock input CLK of the counter CNT. The bits b4–b7 represent a value with b7 being the most significant bit and b4 being the least significant bit. The signal which is applied to the clock input CLK is the signal S whose number corresponds to this value.

Bits b8 is an enable signal. If this bit has the value one (1), the interrupt generator IG is enabled meaning that it can provide an interrupt signal IS as described hereinbefore with reference to FIG. 3. In contrast, if bit b8 has the value zero (0), the interrupt generator is disabled meaning that it cannot provide any interrupt signal IS.

Bit b9 is a stop-or-continue flag. If this flag is set, which means that bit b9 has the value one (1), the counter CNT will continue to count after the count-value CV has become zero. The counter CNT is in a wrap-around mode as it were. If the stop-or-continue flag is not set, which means that bit b9 has the value zero (0), the counter CNT will stop the count once the count-value CV has become zero.

As mentioned hereinbefore, signals S1–S16 originate from various elements in the multimedia processor illustrated in FIG. 2. Signal S1 is a main clock signal of the video output unit HDVO. Signal S2 is a flag contained in an interrupt register within the master control processor MCP. The flag is set when an interrupt generator has provided an interrupt signal. Signal S3 is a flag which indicates that the central processing unit CPU has written an instruction intended for the master control processor MCP in the main instruction register REG. Signal S4 is the result of an AND function applied to the configuration-done signals from all processors P. Signal S5 is the result of an AND function applied to the end-of-operation signals from all processors P. Signal 56 is an enable command for the video output unit HDVO. Signal S7 is the main clock signal divided in frequency by 65536.

Signals S8–S11 originate from the streaming out circuit SO. Signal 58 is a pixel count, signal S9 is an-end-of-line indication, and signal S10 is a beginning-of-field indication. Signal S11 is a warning from the streaming out circuit SO. Signal S12 and S13 is a horizontal synchronization signal and a vertical synchronization signal, respectively. These signals either originate from the streaming out circuit SO or originate from outside the multimedia processor. In the latter case, an external horizontal and vertical synchronization signal are supplied to inputs of the multimedia processor. A switch coupled to these inputs makes that these external signals are supplied to the interrupt generator IG as signals S12 and S13, respectively. Signal S14 is the result of an OR function applied to all interrupt signals. Signal S15 is a reset of a program counter in the central processing unit CPU. Signal S16 is not used.

The interrupt generator IG illustrated in FIG. 3 can be programmed to provide different types of interrupt signals relating to different main events which may occur in multimedia processor illustrated in FIG. 2. Some examples are given hereinafter.

Let it be assumed that it is a main event each time when three lines have been written into the buffer BUF of the streaming out circuit SO. Thus, the interrupt generator IG should provide an interrupt signal IS when this main event occurs. To that end, the master control processor MCP writes the start value SV three (3) in the start-value register VR. The start value SV is transferred to the counter CNT in order to initialize the interrupt generator IG.

The master control processor MCP writes a control word CW into the control register CR in which bits b7–b4 are 1001, respectively, and bits b3–b0 are 0010, respectively. Since the bits b7–b4 represent the value 9, signal S9 is supplied to the clock input CLK of the counter CNT. Signal S9 comprises a positive edge when a line has been written into the buffer BUF. Consequently, the count-value CV of the counter CNT will decrement by one unit when a line has been written into the buffer BUF. Since the start value is three (3), the interrupt generator IG provides an interrupt signal IS when three lines have been written into the buffer BUF. Since the bits b3–b0 represent the value 2, signal S2 is supplied to the load input LD of counter CNT. Signal S2 comprises a positive edge when the interrupt generator IG itself provides an interrupt signal IS. Consequently, when the interrupt generator IG has completed a count of three lines and, as a result, it has provided an interrupt signal IS, the interrupt generator IG prepares itself for a new count of three lines.

Let it now be assumed that it is a main event when, in a processing step, a processor P has not processed the number of pixels it has been configured to process within 300 clock cycles. In other words, it is a main event when a processor P has not completed its processing task within 300 clock cycles. Thus, the interrupt generator IG should provide an interrupt signal IS when this main event occurs. To that end, the master control processor MCP writes the start value SV=300 in the start-value register VR.

The master control processor MCP further writes a control word CW into the control register CR in which bits b7–b4 are 0001, respectively, and bits b3–b0 are 0100, respectively. Since the bits b7–b4 represent the value 1, signal S1 is supplied to the clock input CLK of the counter CNT. Signal S1 is the clock signal and, therefore, it comprises a positive edge with each clock cycle. Since the bits b3–b0 represent the value 4, signal S4 is supplied to the load input LD of counter CNT. Signal S4 comprises a positive edge when all processors have provided a configuration-done signal. This marks the beginning of a processing step. Consequently, at the beginning of each processing step the count value CV is set to 300 and during the processing step the count value CV will decrement by one unit with each clock cycle. Accordingly, the interrupt generator IG will provide an interrupt signal IS if a processor has not finished its processing task within 300 clock cycles.

Let it now be assumed that it is a main event when there is underflow in the buffer BUF in the streaming out circuit SO. Underflow means that the buffer BUF comprises an amount of data which is below a critical level. Thus, the interrupt generator IG should provide an interrupt signal IS when this main event occurs. To that end, the master control processor MCP programs the streaming out circuit SO to provide a warning when the amount of data is below the critical level. The master control processor MCP further writes the start value SV one (1) in the start-value register VR. The start value SV is transferred to the counter CNT in order to initialize the interrupt generator IG.

The master control processor MCP writes a control word CW into the control register CR in which bits b7–b4 are 1011, respectively, and bits b3–b0 are 0010, respectively. Since the bits b7–b4 represent the value 11, signal S11 is supplied to the clock input CLK of the counter CNT. Signal S1 comprises a positive edge when the streaming out circuit SO gives a warning. In that case, the count-value CV of the counter CNT will decrement by one unit and, consequently, it becomes zero because the start value was one (1). Accordingly, the interrupt generator IG will provide an interrupt signal in response to a warning from the streaming out circuit SO. Since the bits b3–b0 of the control word CW represent the value 2, signal S2 is supplied to the load input LD of counter CNT. Signal S2 comprises a positive edge when the interrupt generator IG itself provides an interrupt signal IS. Consequently, when the interrupt generator IG has translated a warning from the streaming out circuit SO into an interrupt signal IS, the interrupt generator IG prepares itself for a new translation.

The master control processor MCP in the multimedia processor illustrated in FIG. 2 may comprise a plurality of interrupt generators IG as described hereinbefore with reference to FIG. 3. Different levels of priorities may be assigned to the interrupt generators IG. When the master control processor MCP simultaneously receives interrupt signals IS from several interrupt generators, it first takes into account the interrupt signal IS provided by the interrupt generator IG having the highest priority.

The following is an example of the master control processor MCP making use of two interrupt generators for the purpose of synchronization. In the example, the multimedia processor illustrated in FIG. 2 receives a new video signal which needs to be displayed. Referring to FIG. 3, signal S12 is a field synchronization signal and signal S13 is a line synchronization signal belonging to the new video signal. The display should start at the tenth line of the first full field in the new video signal instead of directly starting the display of the new video signal. This is to allow the multimedia processor to adapt itself for the new video signal. Accordingly, the multiplexer MUX in the streaming out circuit SO should switch from background pixels to pixels from the new video signal at the tenth line of the first full field of the new video signal.

The master control processor MCP programs a first interrupt generator IG1 to provide an interrupt signal at the beginning of a field. To that end, it writes the start value SV1 one (1) in the start-value register VR1 of the first interrupt generator IG1. The master control processor MCP further writes a control word CW1 into the control registers CR1 of the first interrupt generator IG1. In the control word CW1 bits b7–b4 are 1100, respectively, and bits b3–b0 are 0010, respectively. Accordingly, signal S12, which is the field synchronization signal of the new video signal, is applied to the clock input CLK1 of the interrupt generator IG1. Signal S2, which is a previous interrupt signal, is applied to the load input LD1. The previous interrupt signal indicates that the multimedia processor is ready for display of the new video signal. Accordingly, when the multimedia processor is ready, the interrupt generator IG1 will count down one unit when a positive edge occurs in the field synchronization signal. Since the start value SV1 is one (1), it will immediately provide an interrupt signal.

The master control processor MCP further programs a second interrupt generator IG2 to provide an interrupt at the tenth line of the field. To that end, the master control processor MCP writes the start value SV2 ten (10) in the start-value register VR2 of the second interrupt generator IG2. The master control processor MCP further writes a control word CW2 into the control registers CR2 of the second interrupt generator IG2. In the control word CW2 bits b7–b4 are 1101, respectively, and bits b3–b0 are 0010, respectively. Accordingly, signal S13, which is the line synchronization signal of the new video signal, is applied to the clock input CLK2 of the interrupt generator IG2 and signal S2, which is the interrupt signal provided by the interrupt generator IG1, is applied to the load input LD2. Accordingly, starting at the beginning of the field, the interrupt generator IG2 will count down one unit each time a positive edge occurs in the line synchronization signal. Since the start value SV2 is ten (10), it will provide an interrupt signal at the tenth line of the field. In response to this interrupt signal, the master control processor MCP controls the multiplexer MUX in the streaming out circuit SO such that it start to provide pixels belonging to the new video signal.

The drawings and their description hereinbefore illustrate rather than limit the invention. It will be evident that there are numerous alternatives which fall within the scope of the appended claims. In this respect, the following closing remarks are made.

There are numerous ways of physically spreading functions or functional elements over various units. In this respect, the drawings are very diagrammatic, each representing only one possible embodiment of the invention. Thus, although a drawing shows different functional elements as different blocks, this by no means excludes the implementation of some functional elements or all functional elements as a single physical unit.

Any reference sign in a claim should not be construed as limiting the claim.

What is claimed is:

1. A data processing arrangement (DPA) comprising an interrupt generator (IG) for carrying out a count (CNT) of events (E) of a certain type (T1) which may occur in the data-processing arrangement (DPA) and for providing an interrupt signal (IS) when a predefined number of events (E[T1]) have been counted, wherein the interrupt generator (IG) comprises a programmable selector (SEL[STRT]) for selecting a type (T2) of event (E) which starts (STRT) the count (CNT); and wherein the programmable selector selects a particular signal from a plurality of signals (S1–S16) for application to a load input (LD).

2. A data-processing arrangement (DPA) as claimed in claim 1, characterized in that it further comprises a further programmable selector (SEL2) for selecting the type (T1) of event (E) to be counted.

3. An interrupt generator (IG) for carrying out a count (CNT) of events (E) of a certain type (T1) which may occur in a data-processing arrangement (DPA) and for providing an interrupt signal (IS) when a predefined number (N) of events (E[T1]) have been counted, wherein the interrupt generator (IG) comprises a programmable selector (SEL [STRT}) for selecting a type (T2) of events which starts (STRT) the count (CNT) from a plurality of signals (S1–S16) for application to a load input (LD).

* * * * *